United States Patent [19]
Alanärä et al.

[11] Patent Number: 5,266,782
[45] Date of Patent: Nov. 30, 1993

[54] CONTROL OF A CARD INTERFACE

[75] Inventors: Seppo Alanärä; Heikki Ojaniemi, both of Oulu, Finland

[73] Assignee: Nokia-Mobile Phones Ltd., Salo, Finland

[21] Appl. No.: 673,987

[22] Filed: Mar. 22, 1991

[30] Foreign Application Priority Data

Mar. 22, 1990 [FI]  Finland ................... 901450

[51] Int. Cl.$^5$ .................. H01M 11/00; G06K 5/00
[52] U.S. Cl. ................... 235/380; 235/382; 340/825.31; 379/91; 379/144
[58] Field of Search .............. 235/375, 380, 381, 382; 379/91, 144; 340/825.31, 825.32

[56] References Cited

U.S. PATENT DOCUMENTS

| | | | |
|---|---|---|---|
| 3,169,168 | 2/1965 | Capranica ................ | 379/144 |
| 4,575,719 | 3/1986 | Bertanga et al. ........... | 235/381 |
| 4,588,286 | 5/1986 | Stockburger et al. ....... | 235/382 |
| 4,759,056 | 7/1988 | Akiyama ................. | 379/144 |
| 4,807,286 | 2/1989 | Wiedemer ................ | 235/375 |
| 4,845,740 | 7/1989 | Tokuyama et al. ......... | 235/380 |
| 4,868,846 | 9/1989 | Kemppi .................. | 235/382 |

FOREIGN PATENT DOCUMENTS

| | | | |
|---|---|---|---|
| 219973 | 9/1989 | Japan ................ | 235/375 |
| 96897 | 4/1990 | Japan ................ | 235/381 |
| 2077013 | 12/1981 | United Kingdom ........ | 379/144 |

*Primary Examiner*—John Shepperd
*Attorney, Agent, or Firm*—Darby & Darby

[57] ABSTRACT

An apparatus for a device, particularly a telephone, using a memory card or a smart card inserted into the device including means for checking the identification data of the card and for activating the desired function of the apparatus after the verification of the data. The apparatus may include a memory unit in which the verified identification data read in from the card is recorded and used to compare subsequent identification data read in from a card. Alternatively, the apparatus may compare identification data read in from a card against verification data permanently stored in the apparatus. The apparatus also includes a timer and a comparison means which, on the basis of the output signal of the timer, compare the identification data of the card with either identification permanently stored in the apparatus or verified data previously read in from a card that is recorded in the memory unit, and thus terminate operation if the compared identification data are not identical.

11 Claims, 6 Drawing Sheets

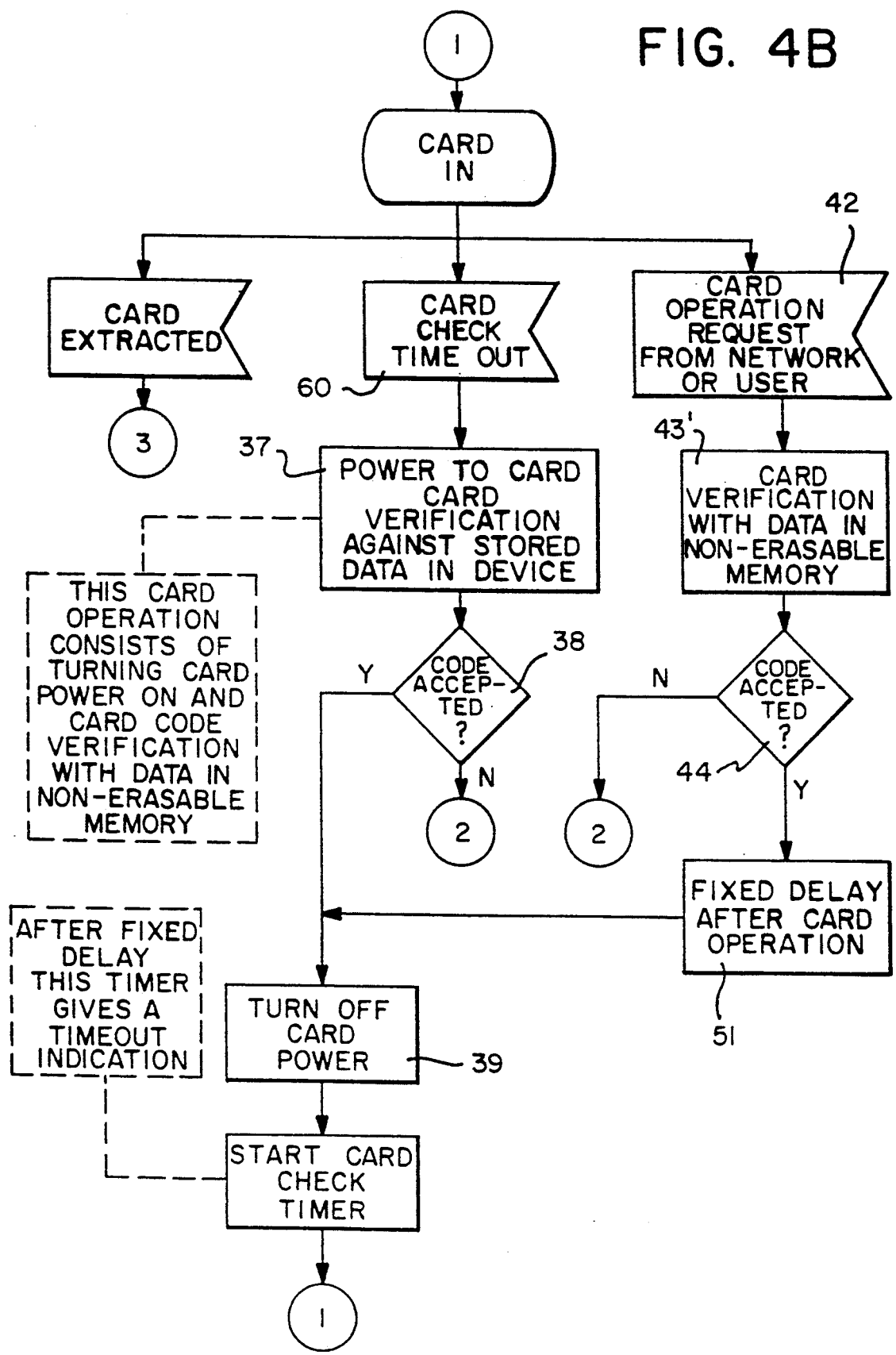

CONTROL OF A CARD INTERFACE

BACKGROUND OF THE INVENTION

The present invention relates to an apparatus for checking the identification data of a card for permitting access to the device once the identification data is verified, and to prevent misuse of the device once access is gained. More particularly, the present invention relates to a radio telephone or the like operated using a smart card or a memory card.

When a device, such as a telephone, is operated using a smart card or a memory card so that the user is billed based on authorization given by this card, it is important to verify the card's identification data before the access to the device is permitted, for example, before placing a call. Verifying the identification data of a card per se is known in the art and several methods have been suggested. For example, in European Patent No. 333,918, a central unit transmits an identification signal and, if this signal agrees with the identification data of the card in the telephone, the central unit permits access to the line. The line will remain open until the card is used in another location. Such an arrangement is highly unreliable because once access to the line has been gained, anyone may use the phone until the card is used at another location.

European Patent No. 301,740 and Swedish Patent No. 456,209 disclose systems where the card's identification data is checked every time an attempt is made to place a call. In EP-301,740 an identification code from a card is read into its nonerasable memory and whenever a call is placed or the apparatus is otherwise programmed, the identification code recorded in the memory is compared to the identification data of the card. If the codes do not agree, no connection is made. In SE-456,209, the checking is done with the telephone exchange. The identification code has both a fixed and a variable part. The variable part depends on the number of connections made and changes in the same manner in both the radio telephone and the telephone exchange. This system cannot be detected by an outside monitor in order to bill the user because the monitor does not know the number of calls that have been placed at any given time. In addition, the publication discloses an additional code which is used only in exceptional cases and cannot be detected easily by an outside monitor. In this arrangement, checking is performed only when a call is placed.

The arrangement described in European Patent No. 333,918 (and other similar arrangements) is the type of system currently used in the art. This system can be circumvented by using a thin plastic strip having the shape of a card. Once access is gained, the telephone remains registered with the information data of the previous card, whereupon unauthorized telephone calls can be charged to the account of the previous card. In devices using a processor card, which applied telephone-specific checking of the identification data, as in European Patent No. 301,740 or Swedish Patent No. 456,209, misuse is more difficult because a call must be placed using the correct card in order to obtain access and the card can be replaced only after the call has been connected. However, even this alternative allows misuse because a card can be used without authorization only for a moment, in which case the correct holder of the card may not notice it, or the same card may be used for simultaneously activating a number of devices. The possibility of even short term access is particularly damaging where the device accessed is an Automated Teller Machine.

Voice identification and fingerprint checking have been suggested as a possible method for preventing misuse, as in German Patent No. 3,438,106, but such systems are very expensive and unreliable. A method for preventing replacement of a card includes placing the card in a mobile slide controlled by a switch and the entire slide is pushed into the apparatus. Another similar structure is disclosed in Norwegian Patent No. 874,965, in which the card is placed in a swiveling compartment or cover, which is controlled by a switch. In these models, misuse is difficult because the card is very difficult to remove without moving the switch which controls the slide, cover, or the like at the same time. However, misuse is possible by sawing an opening into the apparatus allowing replacement of the card.

SUMMARY OF THE INVENTION

The object of the present invention is to provide an arrangement which ensures that the card which originally permitted access to a device has not been replaced by another card even during operation of the device. It is also an object of the invention to use a minimal amount of current in order to maximize the time a portable apparatus may be used before the batteries need replacing or recharging.

According to the present invention, an improvement over the disadvantages of the prior art is achieved.

One advantage of the present invention is the prevention of memory card or smart card misuse, such as where the card which has given access to the device is removed from the device while it is still being used. Another advantage of the invention is that the current consumed by the card operations is minimized, thus making long duration use of a portable device, such as a radio telephone, possible.

BRIEF DESCRIPTION OF THE DRAWINGS

The invention is described below in greater detail with reference to the following figures in which:

FIGS. 4A and 4B are a flow chart of the invention using a non-erasable memory.

DESCRIPTION OF PREFERRED EMBODIMENTS

Figure 1:
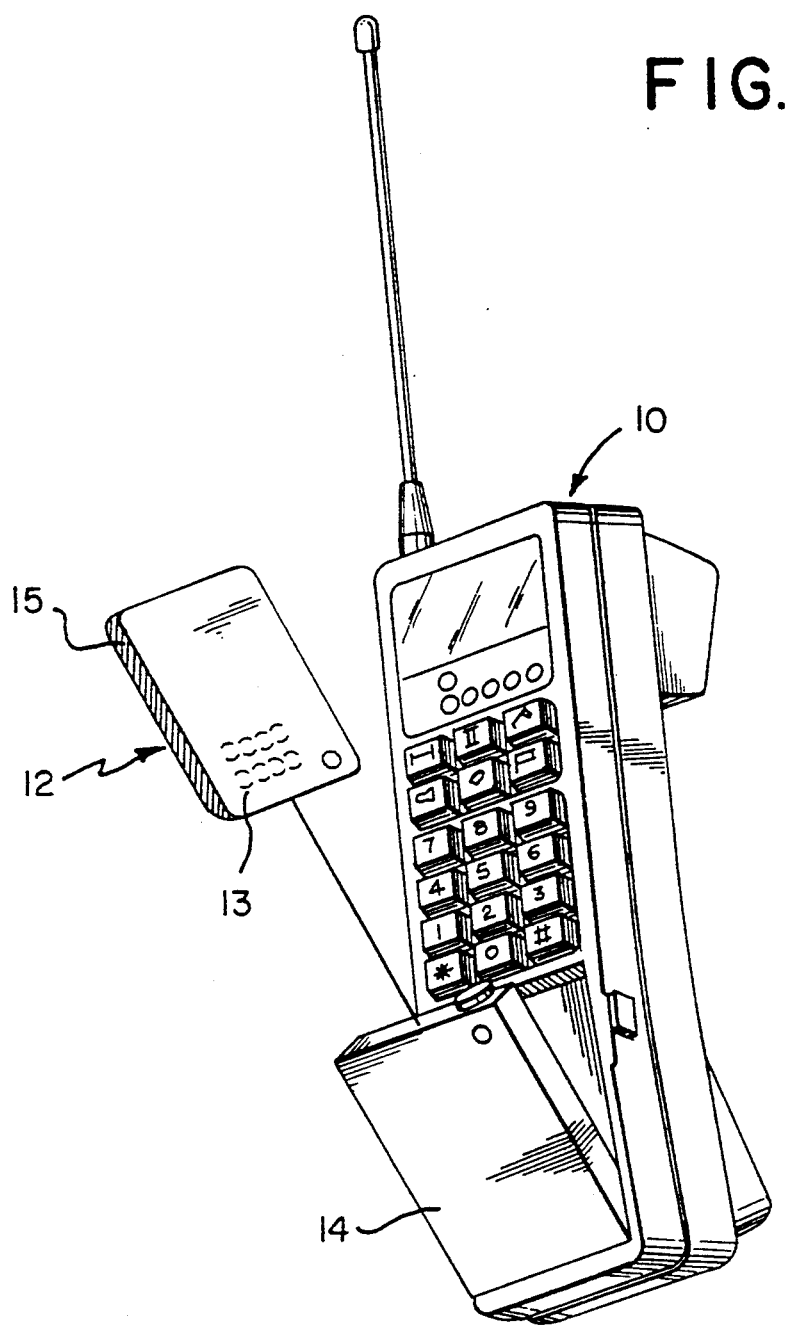
FIG. 1 is a perspective view of a radio telephone using the present invention.

The present invention relates to an apparatus (for example, a telephone as shown in FIG. 1) using a smart card or a memory card 12. The present invention makes it possible to repeatedly check to make sure the card by which access to use of the device was gained has not been replaced by another card. In this context, "access" means that the device has been connected to a data communications network by presenting to the network a valid identification code contained on the card. For example, in radio telephone communication, a telephone is registered in a network (or system) by notifying the network of the telephone number and/or some other additional code contained on the card, which data are compared with the data recorded in the device and/or in the telephone exchange, whereafter the device, e.g., a telephone, becomes operational as a result of this checking, thus permitting the selection of a number or connection of the selected number.

Smart cards and memory cards 12 are small-sized modules, usually the size of a credit card, containing recorded data. Data 13 on a memory card may be read only-they cannot be controlled interactively. A smart card contains the same identification data as a memory card, but the data on it have been protected so that only a person knowing a certain numerical code may access the data on the card, i.e., can use the card. On both types of cards, the data are recorded in a semi-conductor memory. A memory card alternatively may share the information on a magnetic strip 15. Likewise, the information on both types of cards may be read by using contact surfaces in a reader 14 on the device to detect the data on the surface of the card. The readable information is obtained as a series-type signal via one contact surface of the reader. Hereinafter, "card" refers to a smart card or a memory card. The identification data on each of the cards used in the same network are unambiguous.

The term "card operation" refers to any operation relating to the card such as applying power to the card, or reading information from or writing information on to the card. Of course, where the memory card is used, the term "card operation" cannot refer to writing information onto the card because the card has a read-only memory. Where a card operation is performed when power is already applied to the card, a card operation includes reading from and writing to the card.

In order to gain access to a data communications network, the device must include some method or apparatus to ensure that another user attempting to gain unauthorized access does not replace the card originally inserted into the device so that the device, does not detect the replaced card. In such a case, the device would be registered into the network with a false identification code.

Figure 2:
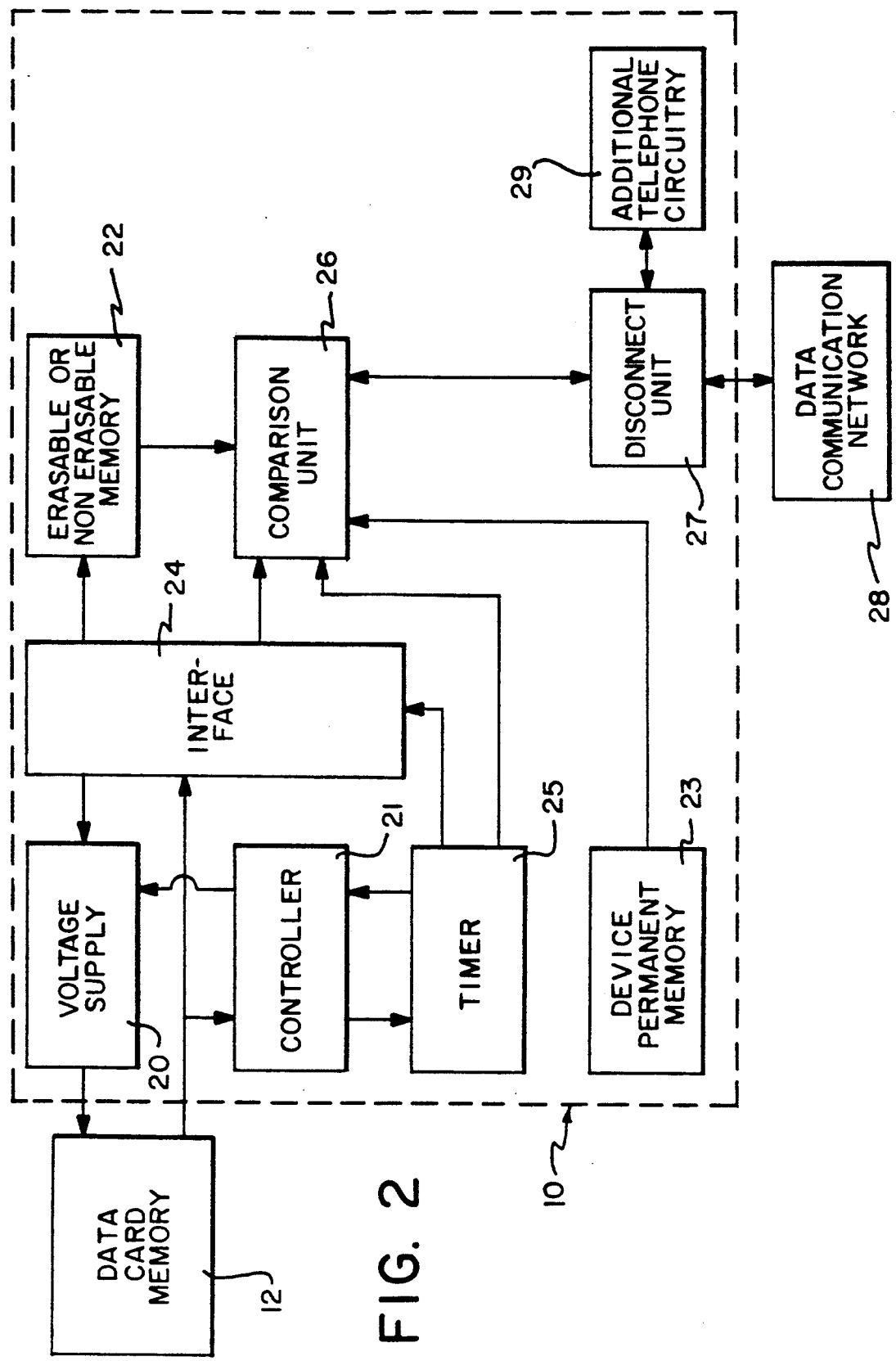
FIG. 2 is a block diagram of the apparatus of the present invention for operations according to the flow charts of FIGS. 3 or 4.
Figure 3A:
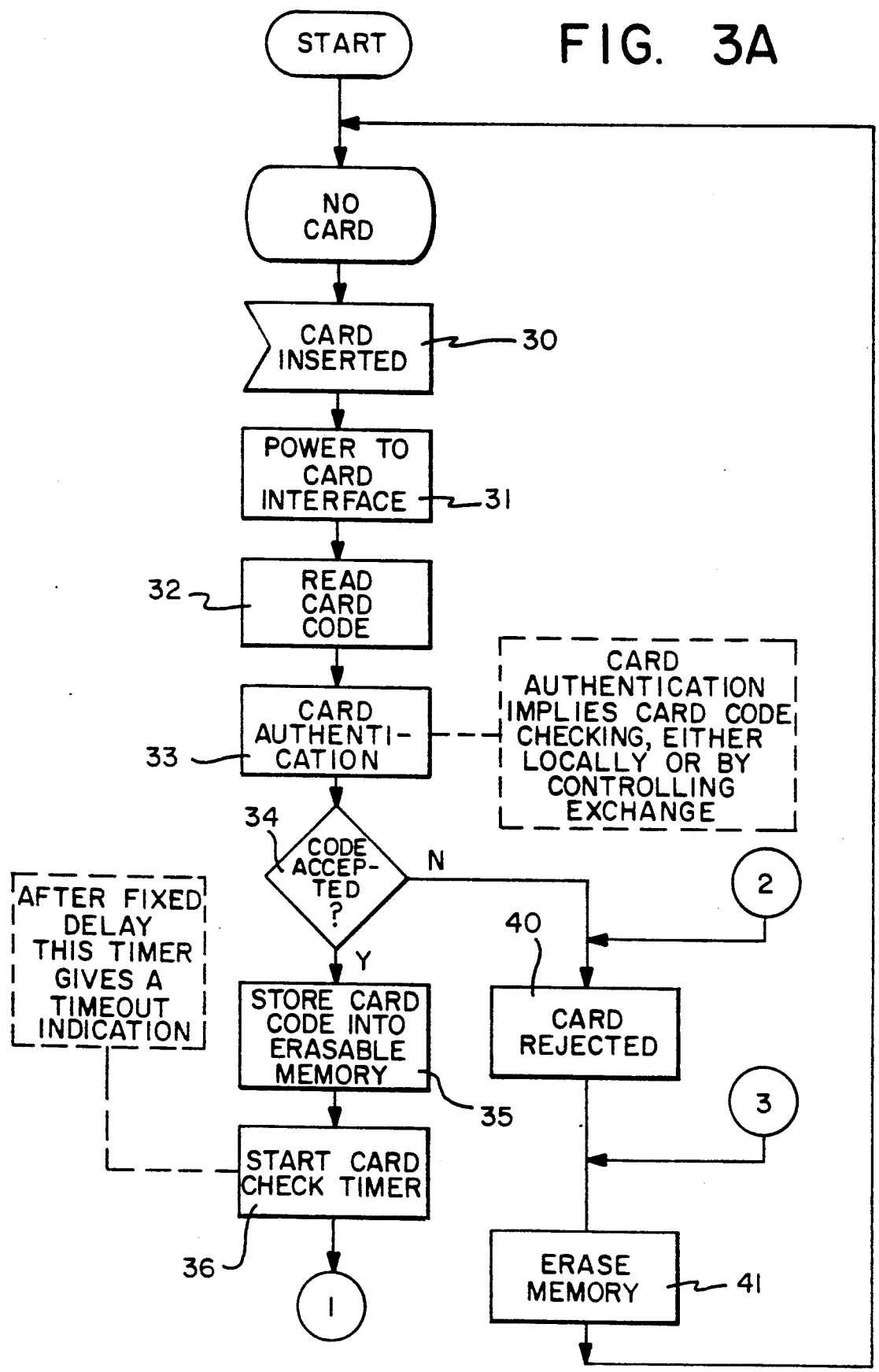
FIGS. 3A and 3B are a flow chart of the invention using an erasable memory.
Figure 3B:
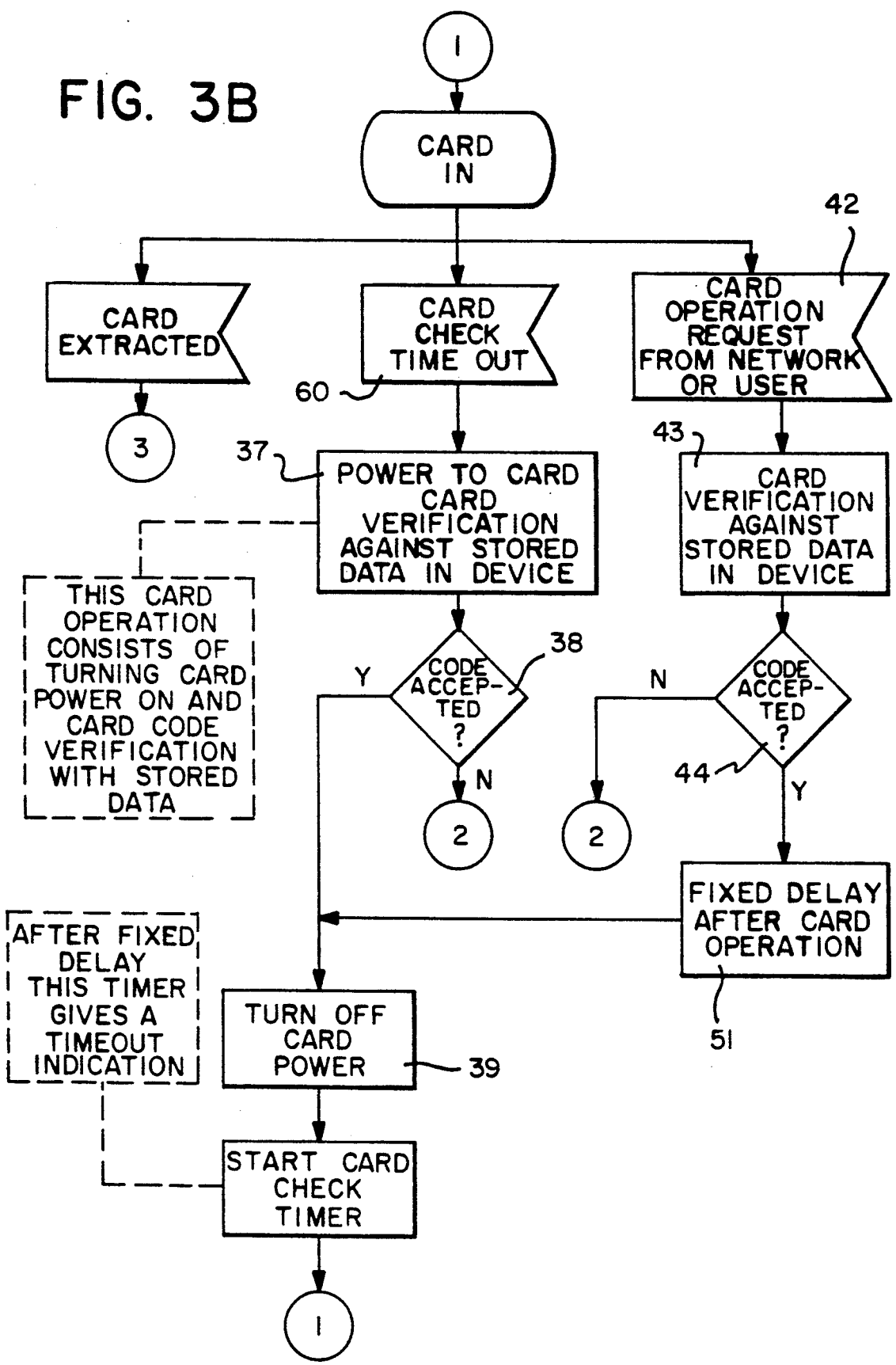

According to the present invention, the operation takes place according to the following process. The device, in this case a telephone 10 (FIG. 1), includes an erasable memory unit 22 (as shown in FIG. 2) or, alternatively, a non-erasable memory unit. In the case of an erasable memory unit, the device operates according to the process illustrated by the flow chart of FIG. 3. In this process, each time the device is used with a card 12 (for example, a telephone call is placed by inserting card 12 into the reader interface 14 of the phone 10), the insertion of card 12 is detected as step 30. This causes a system controller 21, e.g., a programmed microprocessor, to carry out the process of FIG. 3. The first step is that power is applied to the card from voltage supply 20 (FIG. 2), so it can be read (step 31). The identification code on the card is read at step 32 by passing the data through an interface 24 and is compared with data recorded in the device itself, e.g., in memory 23, or in the telephone exchange by a method known in the art (step 33). If the code is not accepted, the card is rejected and a disconnection occurs (step 40). If the code has been accepted (step 34), this code (and possibly other codes of the card) is stored (step 35) in the erasable memory unit 22 (FIG. 2). The device, e.g., the additional telephone circuitry 29, is also registered or connected into the system through a disconnect unit 28, i.e., in this case phone 28 is connected into the data communications network 28. According to the present invention, once it is verified that the card is in place, the verification process is repeated at predetermined time intervals under the control of a timer 25. The code on the card is read and compared with the already verified value stored in the erasable memory unit 22 (step 37). This is represented by the loop of steps 36–39. If the data agree, the operation of the apparatus will continue, but if these two sets of identification data do not agree, the comparison unit 26 (which for this purpose is located within the apparatus) will disconnect the operation of the device (step 40), for example by opening disconnect unit 27 so phone 10 is no longer connected to the network.

Additionally, card verification may be performed when the user attempts a card operation or based upon a network request (steps 42–44). When the code is not verified, a disconnection occurs. This also causes the billing to be discontinued, and thus, the longest possible time of misuse is the brief time interval between two successive verifications. The identification data are erased from the memory unit 22 (step 41) either when the operation of the device ends, i.e., the registration of the telephone, or only when the card is taken out of the device.

When a non-erasable memory unit is used, the operation is in other respects the same as described above, but the identification data are stored only once when the apparatus is taken into use, as in publication EP-301740 [or U.S. Pat. No. 4,868,846 which shares the same priority document], but with the exception that the identification data of the card in the apparatus are checked not only every time the apparatus is registered into the network, i.e. for example when a telephone call is being placed, but also at predetermined time intervals during the telephone call or other operation, as described in the previous paragraph.

The above-mentioned time interval checking is measured by the timer 25 located in the device 10 and the aim is to set as long a possible checking time interval as reasonable so that the comparing will deplete the batteries as little as possible. Comparing at intervals of approximately one minute has been found suitable. Thus, the apparatus may only be fraudulently registered into a network for a maximum of this time interval, i.e., for approximately one minute. This checking interval may be constant, in the manner described above, or it may be programmed to vary in a predetermined manner so that, after the registration of the apparatus, the comparison is performed at short time intervals and, as time passes, the comparison interval is lengthened. This variable time is practical because the longer the operation carried out with the original card continues, the smaller the use gained from the replacement of the card will be. It is also possible to use randomly varied checking time intervals in order to increase the mean time interval and to make it more difficult to anticipate comparison.

Figure 4A:
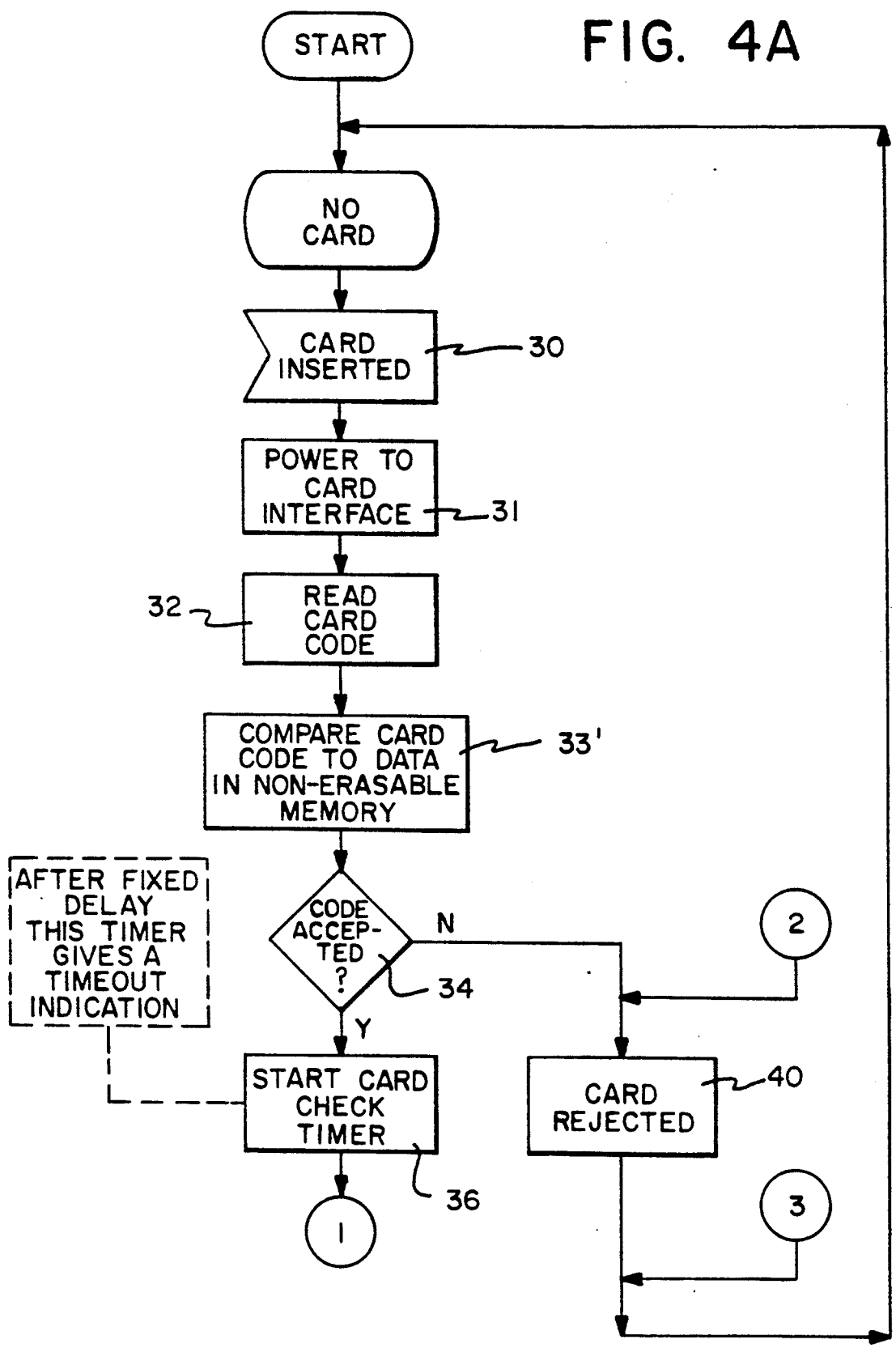

In many cases, for example in the case of a car telephone, the user keeps his card in the telephone when he is near the telephone. In this case, however, there is not a call in progress continuously, but the apparatus is in a stand-by mode or, if there is a call in progress, the need for the card operation is not continuous. However, during both the stand-by and during a telephone call, information is not needed from the card. In this case, current consumption by the device can be reduced by disconnecting the voltage supply 20 from the card when a certain predetermined time has elapsed from the last card operation. The card operation is checked at step 43 in FIG. 3 and step 43' in FIG. 4. This time is preferably measured by the same timer that measures the checking time interval. When the predetermined disconnecting interval has elapsed from a card operation (step 51), the card interface is deactivated and the supply voltage of the card is disconnected (step 39).

At the time of the next card operation, which may require general data to be read from or written into the card, the supply voltage is connected, the card interface is activated, and the card is primed to the mode which preceded the disconnecting of the voltage (step 42). In connection with the initiation of the card interface, before the actual card operation, it is preferable always to carry out a comparison of the identification data (steps 43 or 43'), regardless of whether the timer has given a signal for this or not. Another possibility for initiating a card operation is to delay it until the timer gives a signal for the next comparison of the identification data (step 60), and after this has been done, to carry out the card operation immediately (step 42).

In the manner described above, the card may remain in place with a minimum of current consumption. The present invention can be implemented with a number of circuit arrangements in a plurality of ways. The invention is applicable not only to radio and ordinary telephones, but also to other devices which use memory cards of smart cards.

While the invention has been particularly shown and described with reference to preferred embodiments thereof, it will be understood by those skilled in the art that various changes in form and detail may be made therein without departing from the spirit and scope of the invention.

What is claimed is:

1. An apparatus in a device requiring an authorization for a card inserted into the device to initiate access to a desired function of the device, the device including means for checking identification data on the card and for allowing access to the desired function after the identification data is verified, comprising:
   a memory unit containing verified identification data;
   a timer for generating a timer signal;
   comparison means responsive to the timer signal for comparing identification data on a card in the device during access to the desired function with the identification data contained in the memory unit and for generating a termination signal if the data are not the same;
   termination means responsive to the termination signal for terminating access to the desired function; and
   a system controller interactive with the timer for controlling a supply voltage to the card.

2. The apparatus of claim 1, wherein the memory unit includes a non-erasable memory and the identification data of the card inserted into the device to initiate access to the desired function is recorded at an initiation of the device, whereafter the identification data will remain in the device as a constant for comparison.

3. The apparatus of claim 1, wherein the timer generates the timer signal during each access to the desired function from verification onward, and the timer signal is generated at a constant predetermined time period.

4. The apparatus of claim 1, wherein, during access to the desired function, data is read from the card, and the comparison means perform the comparison in response to such reading in addition to the timer signal.

5. The apparatus of claim 4, wherein the timer is responsive to a card operation and generates a second timing signal at increasing time lengths at the time which has elapsed from a last card operation increases.

6. The apparatus of claim 4, wherein the timer is responsive to the card operation and generates a second timing signal at a varying time period after a last card operation.

7. The apparatus of claim 1, wherein, during access to the desired function, the supply voltage is applied to the card and then data is read from the card, and the system controller disconnects the supply voltage to the card whenever a certain predetermined time has elapsed from a last card operation.

8. The apparatus of claim 7, wherein when the supply voltage to the card is disconnected by the system controller because a predetermined time has elapsed after the last card operation and at least a part of a function order is received by the device to perform one of a reading of information and a writing of information on the card, the information being other than identification data the system controller immediately restores the supply voltage to the card, returns the card to a mode which preceded the disconnecting of the supply voltage, and causes the comparison means to carry out the comparison using the preceding mode before information is read from or written on the card.

9. The apparatus of claim 7, wherein when the supply voltage to the card is disconnected by the system controller because a predetermined time has elapsed after the last card operation and at least a part of a function order is received by the device to perform one of a reading of information and a writing of information on the card, the information being other than identification data the system controller restores the supply voltage to the card when a next timer signal is generated, and then returns the card to a mode which preceded the disconnecting of the supply voltage and causes the comparison means to carry out the comparison using the preceding mode before the information is read from or written on the card.

10. The apparatus of claim 1, wherein the memory unit includes an erasable memory, the identification data of the card inserted to initiate access to the desired function being recorded each time access to the desired function is permitted and the identification data being erased each time access to the desired function is terminated.

11. The apparatus of claim 1, wherein the timer generates the timer signal at a varying time period during each access to the desired function from verification onward.

* * * * *